(No Model.)

J. H. RUSHTON.
LOCKING STEERING GEAR.

No. 383,593. Patented May 29, 1888.

WITNESSES:

INVENTOR:
J. H. Rushton
BY Munn & Co.
ATTORNEYS.

UNITED STATES PATENT OFFICE.

JOHN H. RUSHTON, OF CANTON, NEW YORK.

LOCKING STEERING-GEAR.

SPECIFICATION forming part of Letters Patent No. 383,593, dated May 29, 1888.

Application filed February 3, 1888. Serial No. 262,843. (No model.)

*To all whom it may concern:*

Be it known that I, JOHN H. RUSHTON, of Canton, in the county of St. Lawrence and State of New York, have invented a new and Improved Locking Steering-Gear, of which the following is a specification, reference being had to the annexed drawings, forming a part thereof, in which—

Figure 1:
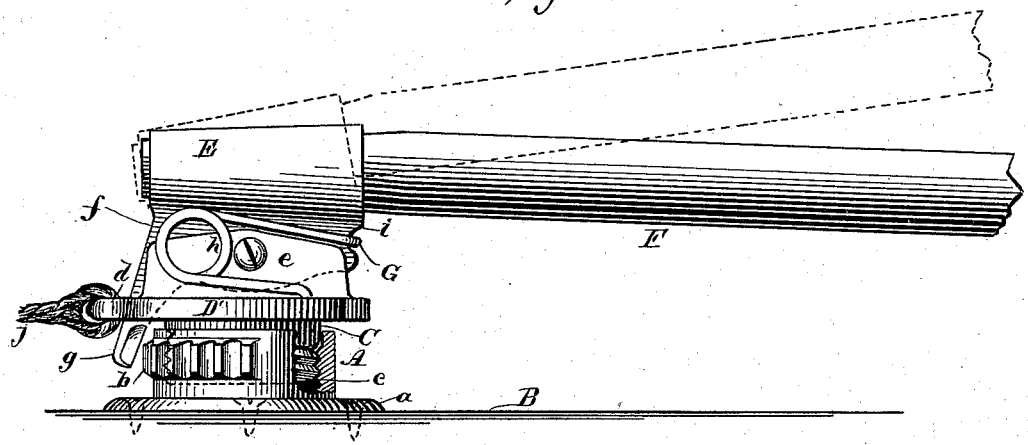
Figure 2:
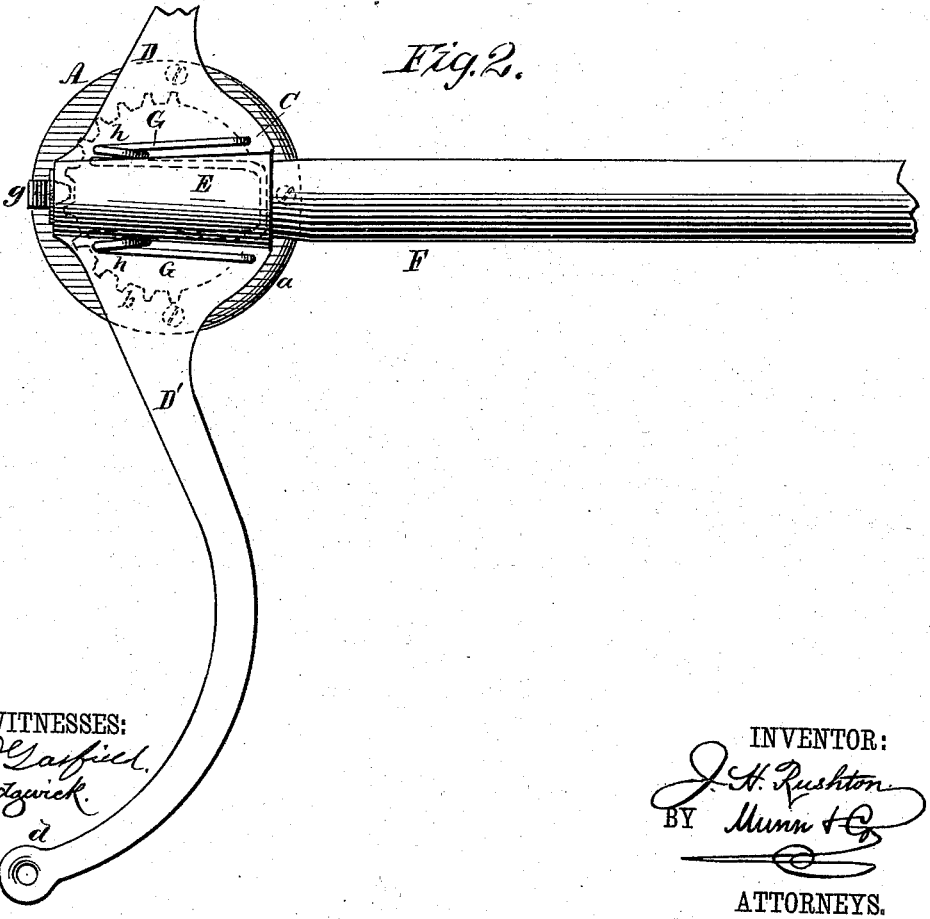

Figure 1 is a side elevation of my improved steering-gear, and Fig. 2 is a partial plan view.

Similar letters of reference indicate corresponding parts in both views.

The object of my invention is to provide a steering-gear for canoes and other light sailing-boats, which may be locked in any desired position, so as to permit the sailor to temporarily attend to other matters.

My invention consists in a socket adapted to be attached to the deck of a boat and provided with a series of teeth, a head pivoted in the socket and carrying arms for receiving cords to be connected with the rudder, and a latch for engaging the teeth of the socket, all as hereinafter more fully described.

The socket A is provided with a flange, $a$, by which it is attached to the deck B of the boat, the said flange $a$ being apertured to receive ordinary wood-screws. The periphery of the socket A is provided with a series of teeth, $b$, separated from each other by equal spaces. The interior of the socket A is screw-threaded, and to the socket is fitted a head, C, provided with a threaded portion, $c$. The head C carries arms D D′, provided with eyes $d$ at their extremities, and the head is also furnished with two ears, $e$, between which is pivoted the flange $f$ of the socket E. Integrally with the flange $f$ is formed an arm, $g$, which projects downwardly from the flange and is adapted to engage the teeth $b$.

The socket E is tapered to receive the end of the tiller F. A double spring, G, formed of a wire bent twice at right angles, with its ends arranged parallel with each other and formed into spirals $h$, is arranged to bear on a shoulder, $i$, formed on the lower part of the socket E in such a way as to press the arm $g$ between the teeth $b$ and raise the tiller F into the position shown in dotted lines whenever it is released by the operator. The eyes $d$ of the arms D D′ are connected with a similar pair of levers on the rudder-post by cords $j$.

The rudder is operated by turning the tiller F, with the head C as a pivot. When the tiller is in the position shown by the full lines, the arm $g$ is withdrawn from the teeth $b$ and the tiller may be moved freely in either direction, as may be required. When the tiller is released, the spring G presses upward the larger end of the socket E, thus causing the arm $g$ to enter between two of the teeth $b$, securely locking the tiller and the rudder connected therewith.

Having thus described my invention, I claim as new and desire to secure by Letters Patent—

1. A locking steering-gear comprising a socket or attaching plate having peripheral teeth, a horizontally-turning head mounted thereon and having oppositely-projecting arms, and a tiller socket or head pivoted to the horizontally-turning head and having an arm or tooth constructed to engage any one of the said teeth, substantially as set forth.

2. The combination, with the internally-screw threaded socket or attaching plate having peripheral teeth, of a screw-threaded head turning horizontally therein and having oppositely-projecting arms, and a vertically-rocking tiller socket or head pivoted on the upper end of the horizontally-turning head and having a downwardly-extending arm engaging one of said teeth, substantially as set forth.

3. A locking steering-gear consisting of the internally-screw-threaded socket A, having the peripheral teeth $b$, the screw-threaded head C, turning horizontally in the socket A and formed with ears $e\ e$ on its upper side and horizontally-projecting arms D D′, the tiller-socket E, having a flange on its under side pivoted between ears $e\ e$, and having a downwardly-projecting arm, $d$, engaging a tooth, $b$, and the double spring G, bearing on the head C and on the socket E, substantially as set forth.

4. The combination, with a head having a vertically-swinging tiller pivoted to its upper side and having a locking-arm at its pivotal end, and a socket upon which the said head turns horizontally, provided with teeth engaged by said locking-arm, whereby the tiller may be locked in any desired position, substantially as set forth.

JOHN H. RUSHTON.

Witnesses:
F. W. SCRIBNER,
WM. RUTHERFORD.